United States Patent
Mulliken et al.

(10) Patent No.: US 12,125,130 B1
(45) Date of Patent: Oct. 22, 2024

(54) PERCEPTUALLY AND PHYSIOLOGICALLY CONSTRAINED OPTIMIZATION OF AVATAR MODELS

(71) Applicants: Grant H. Mulliken, San Jose, CA (US); Akiko Ikkai, Sunnyvale, CA (US); Izzet B. Yildiz, Sunnyvale, CA (US); John S. McCarten, Cupertino, CA (US); Lilli I. Jonsson, Saratoga, CA (US); Olivier Soares, San Jose, CA (US); Thomas Gebauer, Sunnyvale, CA (US); Fletcher R. Rothkopf, Los Altos, CA (US); Andrew P. Mason, Cottesloe (AU)

(72) Inventors: Grant H. Mulliken, San Jose, CA (US); Akiko Ikkai, Sunnyvale, CA (US); Izzet B. Yildiz, Sunnyvale, CA (US); John S. McCarten, Cupertino, CA (US); Lilli I. Jonsson, Saratoga, CA (US); Olivier Soares, San Jose, CA (US); Thomas Gebauer, Sunnyvale, CA (US); Fletcher R. Rothkopf, Los Altos, CA (US); Andrew P. Mason, Cottesloe (AU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/871,760

(22) Filed: May 11, 2020

Related U.S. Application Data

(60) Provisional application No. 62/846,211, filed on May 10, 2019.

(51) Int. Cl.
*G06T 13/40* (2011.01)
*G06F 3/01* (2006.01)
(Continued)

(52) U.S. Cl.
CPC ............ *G06T 13/40* (2013.01); *G06F 3/011* (2013.01); *G06N 3/08* (2013.01); *G06T 13/205* (2013.01); *G06T 15/205* (2013.01)

(58) Field of Classification Search
CPC ....... G06T 13/40; G06T 13/205; G06T 19/20; G06T 2207/30201; G06T 2219/2021;
(Continued)

(56) References Cited

U.S. PATENT DOCUMENTS 9,741,147 B2    8/2017   Allen
9,997,082 B2    6/2018   Kaleal
(Continued)

OTHER PUBLICATIONS

Bailey, et al., "Exploring avatar facial fidelity and emotional expressions on observer perception of the Uncanny Valley," ISAGA 2016, SimTecT 2016: Intersections in Simulation and Gaming, Apr. 1, 2018.

Schwind, Valentin, "Implications of the Uncanny Valley of Avatars and Virtual Characters for Human-Computer Interaction," Jul. 5, 2018.

(Continued)

*Primary Examiner* — Xilin Guo
(74) *Attorney, Agent, or Firm* — Blank Rome LLP

(57) ABSTRACT

Sensor data indicating a user's response to an avatar experience in which the user experiences a rendered avatar model is obtained. A perceptual quality metric value corresponding to the rendered avatar model is determined based on the sensor data and a determined relationship between the sensor data and the perceptual quality metric value. The avatar model is re-rendered for display based on the perceptual quality metric value.

20 Claims, 7 Drawing Sheets

(51) Int. Cl.
*G06N 3/08* (2023.01)
*G06T 13/20* (2011.01)
*G06T 15/20* (2011.01)

(58) Field of Classification Search
CPC ............. G06T 7/70; G06T 2207/20084; G06T 19/006; G06T 13/00; G06T 2200/24; G06T 19/003; G06T 15/20; G06T 2219/024; G05T 15/205; G06K 9/00315; G06K 9/00228; G06K 9/00281; G06K 9/00302; G06K 9/00248; G06K 9/6217; G06K 9/6262; G06N 20/00; G06N 3/08; H04L 51/04; H04L 51/18; G06F 3/011; G06F 16/24578; G06F 3/012; G06F 3/017; G06F 3/013; G06F 3/04815; G06F 3/04842; G06F 3/0346; G06F 1/163; G06V 40/174; G06V 40/16; G06V 20/20; G06V 40/168; H04N 13/383; H04N 21/6587

See application file for complete search history.

(56) References Cited

U.S. PATENT DOCUMENTS

| | | | |
|---|---|---|---|
| 2014/0218371 A1* | 8/2014 | Du | G06T 13/40 345/473 |
| 2014/0362091 A1* | 12/2014 | Bouaziz | G06T 15/503 345/473 |
| 2016/0035132 A1 | 2/2016 | Shuster | |
| 2017/0080346 A1 | 3/2017 | Abbas | |
| 2017/0256086 A1* | 9/2017 | Park | G06T 7/73 |
| 2018/0027307 A1* | 1/2018 | Ni | G06K 9/00315 345/419 |
| 2019/0213772 A1* | 7/2019 | Lombardi | G06T 15/04 |
| 2020/0051304 A1* | 2/2020 | Choi | G06T 15/20 |
| 2020/0051341 A1* | 2/2020 | Lee | G06K 9/4671 |

OTHER PUBLICATIONS

Thaler, et al., "Visual Perception and Evaluation of Photo-Realistic Self-Avatars From 3D Body Scans," Frontiers in ICT, vol. 5, Sep. 4, 2018.

* cited by examiner

PERCEPTUALLY AND PHYSIOLOGICALLY CONSTRAINED OPTIMIZATION OF AVATAR MODELS

BACKGROUND

This disclosure relates generally to the field of electronic communication. More particularly, but not by way of limitation, this disclosure relates to techniques and systems for video communication using avatars that are optimized based on perceptual or physiological experience of a viewer. Computerized characters that represent and are controlled by users are commonly referred to as avatars. Avatars may take a wide variety of forms including virtual humans (individualized, photorealistic, or fantasy ("cartoonish")), animals, and plant life. Some computer products include avatars with facial expressions that are driven by a user's facial expressions in the physical environment. One use of facially-based avatars is in communication, where a camera and microphone in a first device transmits audio and real-time 2D or 3D avatar data of a first user to one or more second users such as other mobile devices, desktop computers, videoconferencing systems, head mounted systems, and the like.

SUMMARY

In one embodiment, an avatar model rendering method includes: obtaining sensor data indicating a user's response to an avatar experience in which the user experiences a rendered avatar model; determining a perceptual quality metric value corresponding to the rendered avatar model based on the sensor data and a determined relationship between the sensor data and the perceptual quality metric value; and re-rendering the avatar model for display based on the perceptual quality metric value.

In another embodiment, the method may be embodied in computer executable program code and stored in a non-transitory storage device. In yet another embodiment, the method may be implemented on a system.

DESCRIPTION

Figure 1:
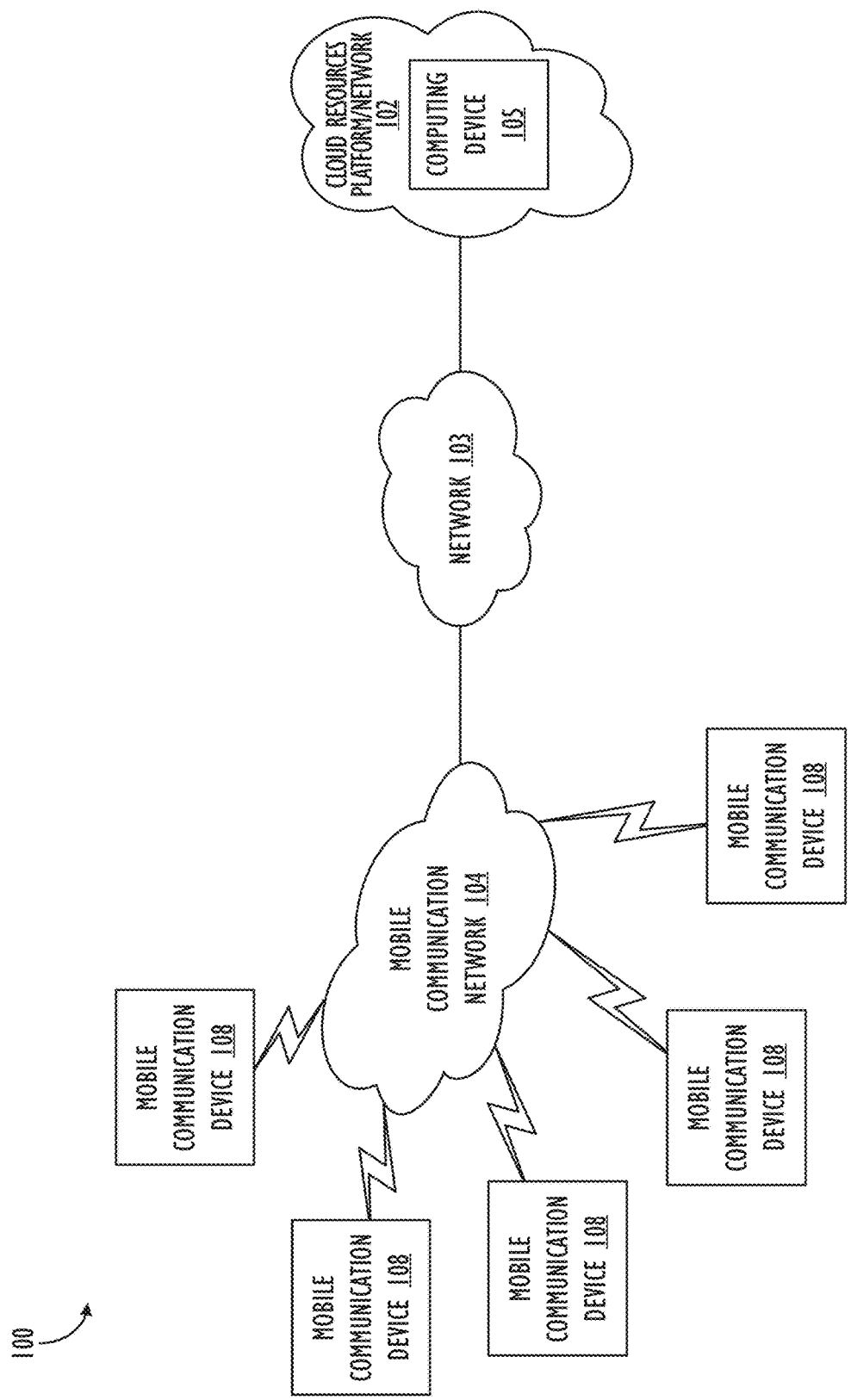
FIG. 1 shows a network system for avatar model rendering in accordance with one or more embodiments.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

This disclosure pertains to optimizing (e.g., adjusting, updating, and the like) an avatar model based on perceptual (e.g., behavioral), physiological, and/or direct-report data from a viewer experiencing a rendering of the avatar model. An avatar model (e.g., 2D or 3D polygonal mesh of a face or body) created to resemble a specific user may be driven based on input stimulus (e.g., changing facial expressions and/or sound/speech of the specific user during electronic communication with one or more other users) to generate avatar data. The generated avatar data may be used to render the avatar model on a 2D or 3D display of the one or more other users the specific user is in electronic communication with. Prior to transmission, the avatar data may be compressed using a compression agent or algorithm (e.g., autoencoder, generative adversarial networks (GANs), or another type of artificial neural network). The compression agent may be trained to store a representation of the avatar model into a compressed latent space, and then be able to reconstruct the avatar model from the latent space while minimizing a cost function (e.g., regularization cost, reconstruction cost, and/or perceptual cost). The transmitted avatar data may thus correspond to data corresponding to the compressed latent space of the compression agent. Storing the avatar data into the compressed latent space may reduce transmission bandwidth requirements. An instance of the compression agent at the receiving user's device may then be utilized to reconstruct the original avatar data for rendering and displaying the avatar model on the device.

While the user of the receiving device is experiencing the rendered avatar model reconstructed from the received latent space data, one or more sensors on the receiving user's device may capture perceptual, physiological, and/or direct-report response (e.g., head/body movement, facial expressions, emotions, head nods, conversational cadence, gaze patterns, heartbeat, electroencephalography (EEG) data, functional near-infrared spectroscopy (fNIRS) data, direct input by the user on a slider bar, and the like) of the user. The sensor data may indicate a level of the user's perceptual or cognitive comfort with one or more attributes (e.g., rendering quality, movement or motion of one or more avatar modules (e.g., eyes, lips, cheeks, and the like), sound, speech, general face dynamics, and the like) of the rendered avatar model in real-time, while the user is experiencing or interacting (e.g., communicating) with the rendered avatar model. For example, the sensor data may indicate if the user finds the rendered avatar model to be uncanny (e.g., eerie, arousing a sense of uneasiness or revulsion in the viewer), and therefore, unpleasant to view throughout the avatar-human interaction. In one embodiment, a perceptual model generated and trained based on machine learning techniques may quantitatively characterize a relationship between the measured sensor data values and avatar perceptual quality values. Once trained, the perceptual model may be utilized to predict based on the sensor data whether (or to what degree) the current user experiencing the rendered avatar model finds the avatar to be, e.g., uncanny, and output the result as a perceptual quality metric (e.g., value between 0-1). The perceptual model may further be trained to predict respective values of the perceptual quality metric for each of a plurality of modules (e.g., eyes, lips, nose, chin, arms, shoulders, legs, and the like) of the rendered avatar model. The predicted one or more values for the perceptual quality metric may then be used as a perceptual cost that is to be accounted for when training the compression agent corresponding to the rendered avatar model. For example, if the compression agent is an autoencoder, the autoencoder may be retrained (e.g., intermittently or periodically) to update corresponding latent space variables (e.g., weights of edges or nodes of one or more hidden layers) to minimize the cost function into which the perceptual cost predicted by the perceptual model is augmented. This technique may also be used to account for (and correct/minimize) the respective perceptual cost predicted for each module of the avatar model. Once retrained, the autoencoder with the updated latent space may be redeployed on devices and the decoder portion of the autoencoder used by the receiver device to reconstruct the avatar model for rendering an updated/perceptually optimized avatar model that is optimized or adjusted based on the individual/specific user's perceptual and cognitive comfort level. For example, one or more attributes (e.g., avatar rendering quality, avatar movement or motion, avatar sound or speech, and the like) of the rendered avatar model may be updated based on the perceptual quality metric value.

Instead of predicting renderings that are uncanny, the perceptual model may also be trained to optimize or adjust the compression agent for other applications that involve deviating from realism or authenticity, e.g., improving appealability of a fantasy "cartoon" character, updating a teacher avatar model for more effective instruction and information delivery, creating a more persuasive salesman avatar model for better product marketing, and the like. Further, the perceptual model may be customized for each individual user to optimize the corresponding compression agent based on individual user preferences or conditions. By optimizing the avatar model based on individualized perceptual measures or conditions, avatar acceptability can be improved. Finally, the behavioral and physiological signals (e.g., sensor data) could be used to learn and create different categories of avatar models that correspond to different contexts or different emotions of the user. For example, depending upon one's situation, one of many potential avatar models could be selected and optimized for the user (e.g., a typical office worker, typical guest at restaurant, typical dinner guest, typical bus passenger, and the like).

For purposes of this disclosure, the term "physical environment" refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, the term "computer-generated reality (CGR) environment" refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

As used herein, the term "virtual reality (VR) environment" refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, the term "mixed reality (MR) environment" refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality.

Within this disclosure, the term "augmented reality (AR) environment" refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

For purposes of this disclosure, "an augmented virtuality (AV) environment" refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

FIG. 1 shows network system 100 for avatar model rendering in accordance with one or more embodiments. As shown in FIG. 1, network system 100 includes cloud resources platform/network 102, network 103, and mobile communication network 104 (e.g., cellular and/or satellite network). Cloud resources platform/network 102 may be configured as a remote network (e.g., a cloud network) that is communicatively coupled with mobile communication network 104 and mobile communication devices 108 on mobile communication network 104 via network 103. Cloud resources platform/network 102 may act as a platform that provides additional computing resources and/or functionality to mobile communication devices 108. For example, by utilizing cloud resources platform/network 102, compression agents (e.g., for avatar model based electronic communication between mobile communication devices 108) and/or perceptual models (e.g., for predicting individualized perceptual comfort levels to experiencing avatar model renderings) may be generated, trained, or optimized for individual users, and users of mobile communication devices 108 may be able to obtain the trained compression agents and/or perceptual models deployed on the cloud in order to optimize avatar model-based electronic communication. The trained compression agents and/or perceptual models may be deployed on one or more computing devices 105 on cloud resources platform/network 102. The one or more computing devices 105 may include computers, servers, hosts, laptops, mobile devices, electronic user devices, robotic systems, and/or any other types of computing devices capable of communicating and transporting data (e.g., avatar model data, perceptual model data, compression agent data, image data, audio data, and the like) with network 103.

FIG. 1 illustrates that cloud resources platform/network 102 is coupled to network 103. Network 103 may include one or more computing networks, such as other LANs, wide area networks (WANs), the Internet, and/or other remote networks, to transfer data (e.g., avatar model data, perceptual model data, compression agent data, image data, audio data, and the like) between mobile communication network 104 and cloud resources platform/network 102. Each of the computing networks within network 103 may contain wired and/or wireless programmable devices that operate in the electrical and/or optical domain. For example, network 103 may include wireless networks, such as cellular networks in addition to mobile communication network 104. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 103 may also employ any number of network communication protocols, such as Transmission Control Protocol (TCP) and Internet Protocol (IP). Although not explicitly shown in FIG. 1, network 103 may include a variety of network devices, such as servers, routers, network switches, and/or other network hardware devices configured to transport data over networks.

In FIG. 1, mobile communication network 104 is coupled to network 103 and can transport data and provide communication services to multiple mobile communication devices 108 that include computers, laptops, mobile devices, and/or other electronic devices that can receive and transmit data (e.g., avatar model data, compression agent data, perceptual model data, image data, audio data, and the like) over a radio-based communication network. Generally, the mobile communication network 104 is capable of supporting communication between two or more mobile communication devices 108 without the devices being physically connected (e.g., wired connection). The mobile communication network 108 may also incorporate multiple cellular towers and base stations that provide communication services and transport data between mobile communication devices 108 and/or computing device 105.

In one or more embodiments, the mobile communication devices 108 and/or computing devices 105 represent different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., eyeglasses, or similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, organic light emitting diodes (OLEDs), LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figures 2A, 2B:
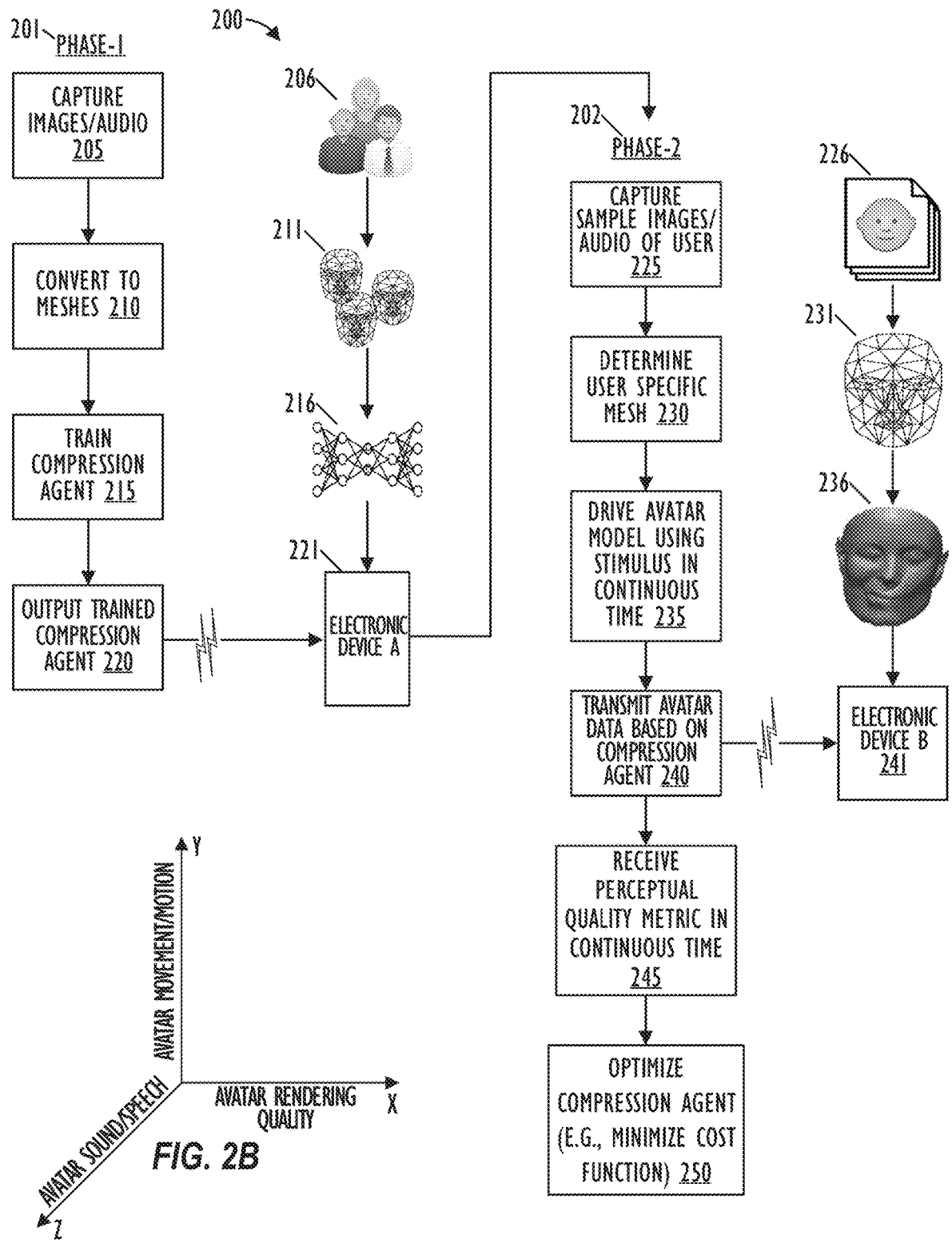
FIG. 2A shows, in flowchart form, an avatar model generation, use, and optimization operation in accordance with one or more embodiments.
FIG. 2B illustrates exemplary axes of a three-dimensional cartesian coordinate system for avatar optimization in accordance with one or more embodiments.

FIG. 2A shows, in flowchart form, avatar model generation, use, and optimization operation 200 in accordance with one or more embodiments. As illustrated in FIG. 2A, operation 200 may include two phases. In phase-1 201, a compression agent may be generated or trained offline or a priori based on generic user population data (e.g., image and/or audio data of a population of users). The compression agent in phase-1 201 may be trained to generate multiple models including a neutral expression model, an expression model, a trained convolutional neural network (CNN), audio model, a combination of any of these models, and the like. The neutral expression model (e.g., identity model) may be based on the population of images and correspond to a particular geometry of a user's face in a neutral pose (i.e. a pose that lacks expression; e.g., not happy, not sad, not excited, not fearful, and the like). The expression model of the compression agent may also be generated based on the population of images and may indicate a particular geometry of a user's face in an expressive state (e.g., happy, sad, excited, fearful, and the like). The CNN of the compression agent may be trained to process streaming input such as video and/or audio. Additional models for audio compression may also be generated and trained as part of the offline (e.g., on a computer farm) compression agent training. If desired, optional conditional variables may be applied to the neutral expression model and/or the expression model to further refine the model's output. Illustrative conditional variables include, but are not limited to, gender, age, body mass index, and the like. In one or more embodiments, incorporating conditional variables into the neutral expression model and/or the expression model may enable the model to better differentiate between facial characteristics associated with such factors as age, gender, body mass index, and the like and/or better refine characteristics of various emotional states in the model. In one or more embodiments, instead of obtaining separate neutral "identity" models and expression models, the compression agent may be trained to generate an avatar from a single model that considers both identity and expression.

In phase-2 202 the trained compression agent, in combination with a limited amount of person-specific data, may be used to generate a high-quality avatar model (e.g., photorealistic three-dimensional avatar) representative of that person. Phase-2 may also involve optimizing (e.g., adjusting or updating) the generated high-quality avatar model (for a specific receiver or for all receivers) by changing the underlying compression agent (e.g., optimize expression model, identity model, CNN, audio model, combination model, and the like) based on output of a perceptual model that considers perceptual, physiological, and/or direct-report data for a viewer experiencing a rendering of the high-quality avatar model.

More specifically, in FIG. 2A, phase-1 201 of operation 200 begins with acquisition of images and audio data 206 from a relatively large number of individuals (block 205). Images 206 may include both neutral images of individuals having a neutral expression and expression images of individuals having a non-neutral expression. Images 206 may, for example, be obtained via a photogrammetry or stereo-photogrammetry system, a laser scanner or an equivalent capture method. Each image 206 may be converted into a three-dimensional (3D) mesh representation 211 (block 210) and used to train or generate the compression agent (block 215). Audio data may also be similarly obtained from the population and converted, and used to train or generate additional models of the compression agent at block 215. In one embodiment, the compression agent may be implemented using one or more autoencoder neural networks 216. At block 220, the trained compression agent is output to electronic device A 221 for use (e.g., one or more trained autoencoder neural networks 216 for audio, neutral expression, non-neutral expression, and the like, are output).

Phase-2 202 begins when a device's image capture unit(s) or camera(s) or microphone(s) are used to acquire a relatively limited number of images and audio data 226 of a specific person (block 225). Images and audio data of the specific person (e.g., audio/video stream) may be applied to the prior trained (and received) compression agent to obtain avatar model 231 (e.g., identity model, expression model, audio model, combination of one or more models, and the like) corresponding to the specific user (block 230). In some embodiments the specific user's avatar model may be encoded and stored for future use. In one embodiment a user's avatar model (e.g., identity model) may be represented as a mesh network (e.g., configured to create a photorealistic 3D avatar of the specific user). At run-time, when the specific user is communicating with a second person via an application that employs an avatar, real-time images and/or audio (e.g., avatar stimulus data representing facial expressions, and the like) may be captured of the specific user, and used to drive the individual's prior created avatar model 236 (block 235). The resulting avatar data generated at block 235 and representing an animated avatar may be processed by the trained compression agent (e.g., autoencoder) to be represented into a (compressed) latent space and the resultant compressed latent space data may be transmitted to distal electronic device B 241 (block 240) for rendering and display.

As will be explained in further detail below in connection with FIGS. 4-5, the avatar model rendering method and system according to one or more embodiments also includes a perceptual model that is trained to output a predicted value (e.g., avatar realism quality value, perceptual quality metric value) quantifiably characterizing the user's level of perceptual comfort in real-time while experiencing a rendering of the avatar model rendered based on avatar data transmitted at block 240. For example, one or more sensors on (or associated with) electronic device B 241 may capture one or more types of perceptual, physiological, and/or direct-report data corresponding to the user of electronic device B 241 who is experiencing the rendering of the avatar model based on avatar data received at electronic device B 241 (and based on an instance of a decoder portion of the trained compression agent at electronic device B 241). Based on the values for the one or more types of sensor data, the trained perceptual model may generate (e.g., intermittently or periodically) a perceptual quality metric whose value may quantitatively characterize the user's perceptual or cognitive comfort level with the avatar experience in continuous time. This perceptual quality metric value may be transmitted by the receiver device (e.g., electronic device B 241). The sender device (e.g., electronic device A 221) may receive the perceptual quality metric corresponding to the rendered avatar model in continuous time (block 245). At block 250, electronic device A 221 may optimize the compression agent (e.g., optimize, update or adjust one or more of identity model, expression model, audio mode, CNN, combination thereof, and the like of corresponding avatar model) based on the value(s) of the received perceptual quality metric(s). In one embodiment, the compression agent may be optimized only when the perceptual quality metric value satisfies a predetermined threshold (e.g., value falls below a predetermined amount).

For example, when the compression agent is an autoencoder, optimizing the compression agent might encompass retraining the autoencoder (corresponding to one or more of audio model, identity model, expression model, combination model, and the like) to minimize a cost function to which the value of the perceptual quality metric has been augmented as a perceptual cost. In optimizing the compression agent at block 250, electronic device A 221 may be able to selectively adjust different modules of the avatar model (e.g., eyes, lips, mouth, nose, legs, shoulders, and the like of the avatar model) differently, based on corresponding received values for the perceptual quality metric. For example, if the perceptual cost increases only for the mouth region, the compression agent optimization operation at block 250 may only adjust the weights for the mouth, to only adjust the resultant rendering of the mouth region of the avatar model.

In optimizing the compression agent at block 250, electronic device B 221 may adjust one or more attributes (e.g., rendering quality, movement or motion of one or more avatar modules (e.g., eyes, lips, cheeks, and the like), sound, speech, general face dynamics, and the like) of the avatar model based on received perceptual quality metric data at block 245 and optionally, based on whether the received perceptual quality metric data satisfies a threshold. For example, electronic device B 221 may optimize the avatar model in a three-dimensional space defined by three axes as shown in FIG. 2B, where a first axis (X) defines optimizing avatar rendering quality (e.g., resolution or bit depth of the rendered avatar model), a second axis (Y) defines optimizing avatar movement or motion (e.g., how the avatar moves or animates), and a third axis (Z) defines optimizing avatar sound or speech (e.g., how the avatar sounds or what it speaks). The correct combination of optimizations to be applied to the compression agent (and hence, the avatar model) may depend on the perceptual data as gleaned from the user's perceptual, physiological, and/or direct-report response to experience the rendered avatar model.

Although FIG. 2A illustrates an embodiment where a sender device (e.g., electronic device A 221) in electronic avatar-based communication may perform the optimization operation at block 250, this may not necessarily be the case. The optimization operation at block 250 may be performed, alternatively or in addition, by a cloud-based system (e.g., computing device 105 on cloud resources platform/network 102 in FIG. 1), or by a receiving device (e.g., electronic device B 241) or other local or remote device. For example, the compression agent trained or generated at block 215 in phase-1 201 may be updated (retrained) based on the received perceptual quality metric data at block 245. This updated compression agent may then be redeployed on all participating electronic devices (e.g., electronic devices 221 and 241, and the like).

Also, although FIG. 2A illustrates driving of avatar model at block 235 based on real-time images/audio data of a specific person in active communication with another user of a distal electronic device, this may not necessarily be the case. That is, the avatar data generated at block 235 based on stimulus data may be data corresponding to a "synthetic" avatar (e.g., fantasy avatar or "cartoon" avatar created based on an artificial intelligence (AI) system that is designed to act intelligently based on input stimulus). A user may thus interact with the avatar of the AI system and based on the "stimulus" provided by the user's interaction, the synthetic avatar may be driven at block 235, and corresponding avatar data generated by the compression agent at block 240 and transmitted.

Example applications of synthetic avatars may include: an avatar adapted during language learning (e.g., attributes of the language teaching avatar may transition from familiar facial features to different by adjusting the compression agent); an avatar to assist with rehabilitation of individuals with autism, social anxiety disorder, teach social protocols, and the like (e.g., attributes of the avatar may transition from less emotive to more human-like by optimizing the compression agent based on perceptual quality metric); a teacher avatar optimized for more effective instruction and information delivery (e.g., attributes of the teacher avatar may transition from familiar/gentle to different/strict by optimizing the compression agent.)

Figure 3:
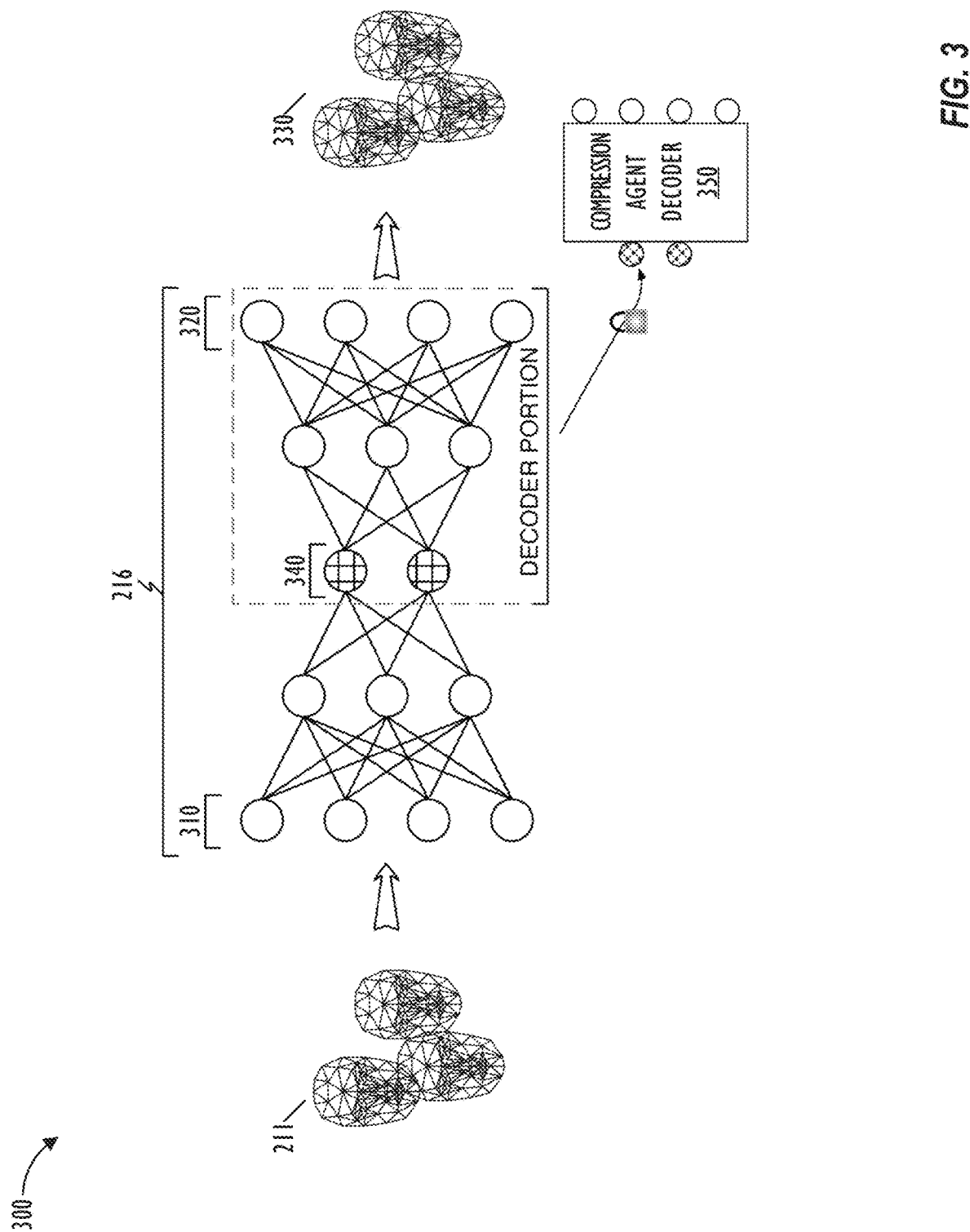
FIG. 3 shows an autoencoder neural network training operation in accordance with one or more embodiments.

FIG. 3 shows autoencoder neural network training operation 300 in accordance with one or more embodiments. Although FIG. 3 generally shows autoencoder neural network training operation 300 for input mesh data that may be performed while training compression agent at block 215 in FIG. 2, it will be appreciated by those skilled in the art that similar training operations 300 can be respectively performed separately for each of an audio model, expression model, and identity (neutral expression) model, and the like. Those skilled in the art will also appreciate that training operation 300 may be combined for meshes of both the expression model and the identity model. As shown in FIG. 3, in one or more embodiments, autoencoder neural network training operation 300 can apply each (neutral expression and/or non-neutral expression) 3D mesh from the collection of 3D meshes 211 (one at a time to input layer 310) to train autoencoder neural network 216 to generate (at output layer 320) output meshes 330 (one for each input mesh). Autoencoder neural network 216 may include a traditional autoencoder or a variational autoencoder. The variational autoencoder may be trained in a probabilistic manner. In one embodiment, autoencoder neural network 216 employs unsupervised learning technology to discover a function $f(x)=\hat{x}$, where x represents an input (e.g., one of meshes 211) and $\hat{x}$ represents an output (e.g., one of meshes 330). Training causes autoencoder 216 to learn the identity function so that $x \approx \hat{x}$. By limiting the number of hidden units (number of nodes of hidden layer) with respect to the number of input and output units, autoencoder 216 can determine or identify a "compressed" representation of its input. As used here, the phrase "hidden units" refers to units of any hidden layer within autoencoder 216 that is between input layer 310 and output layer 320. By way of example, if there are 15,000 nodes (units) in each input mesh (each node representing a 3D point), and 15,000 nodes in each output mesh, but only 15, 25, 30 or 50 nodes (units) in a selected (hidden) layer within autoencoder 216 (e.g., layer 340), the value of those nodes (and weights of corresponding edges connecting each unit or node of each layer of the network to units of the next layer) must represent or encode each input mesh's corresponding 15,000 node output mesh. When trained, the nodes of selected hidden layer 340 (e.g., that layer with the smallest number of nodes) and weights of the edges between two layers represent the latent variables (latent space) of the neural network system. Once autoencoder neural network 216 has been trained, its decoder portion may be retained and locked (so that its internal node values no longer change or adapt to input) to form compression agent decoder 350. Compression agent decoder 350 may then be used by a receiving device (e.g., electronic device B 241) to render an avatar model based on received compressed latent space data (e.g., weight of nodes and edges of the decoder).

In the embodiment where the compression agent is implemented using the autoencoder, the compression agent adjustment operation based on determined perceptual quality metric at block 250 may also involve retraining the autoencoder (e.g., retraining autoencoder corresponding to one or more of identity model, expression model, audio model, and the like) similar to the autoencoder neural network training operation 300 described in FIG. 3. However, in case of the autoencoder training operation corresponding to block 250, the overall cost function the autoencoder is trying to minimize has been augmented to consider an additional perceptual cost term (i.e., the cost corresponding to the perceptual quality metric). The optimization operation at block 250 may be performed intermittently, periodically, or on-demand during a batch process.

The overall cost function the optimization operation at block 250 is trying to minimize may be defined as follows:

$$\text{Overall Cost} = \text{reconstruction cost term} + \text{regularization cost term} + \text{perceptual cost term} \quad \text{Equation (1)}$$

In the above equation, the perceptual cost term (e.g., as predicted by the trained and deployed perceptual model) may be defined as any quantifiable deviation from natural/desired behavioral/physiological patterns. The compression agent (e.g., autoencoder) may be optimized by updating the existing renderer (e.g., update weights in a neural network) using the new cost (including perceptual cost), intermittently during a batch process. In this training operation, since there is not a direct mathematical relationship between the new additive perceptual cost term and the weights/inputs of a particular neural network, traditional gradient-based methods (e.g., backpropagation) cannot be used for learning, and instead, it may be necessary to apply local learning approaches (e.g., direct feedback alignment, random backpropagation, and the like) that avoid error propagation and can transmit teaching signals across multiple layers. In another embodiment, the perceptual cost term may be integrated in a multiplicative (not additive) way, whereby the perceptual cost gain modulates the reconstruction and regularization costs, which will allow traditional gradient-based learning methods to be used. The training algorithm's overall cost function may be augmented with this additional term. The overall cost function minimization operation is described in further detail in connection with FIG. 5 and Equation (2) below.

Figure 4:
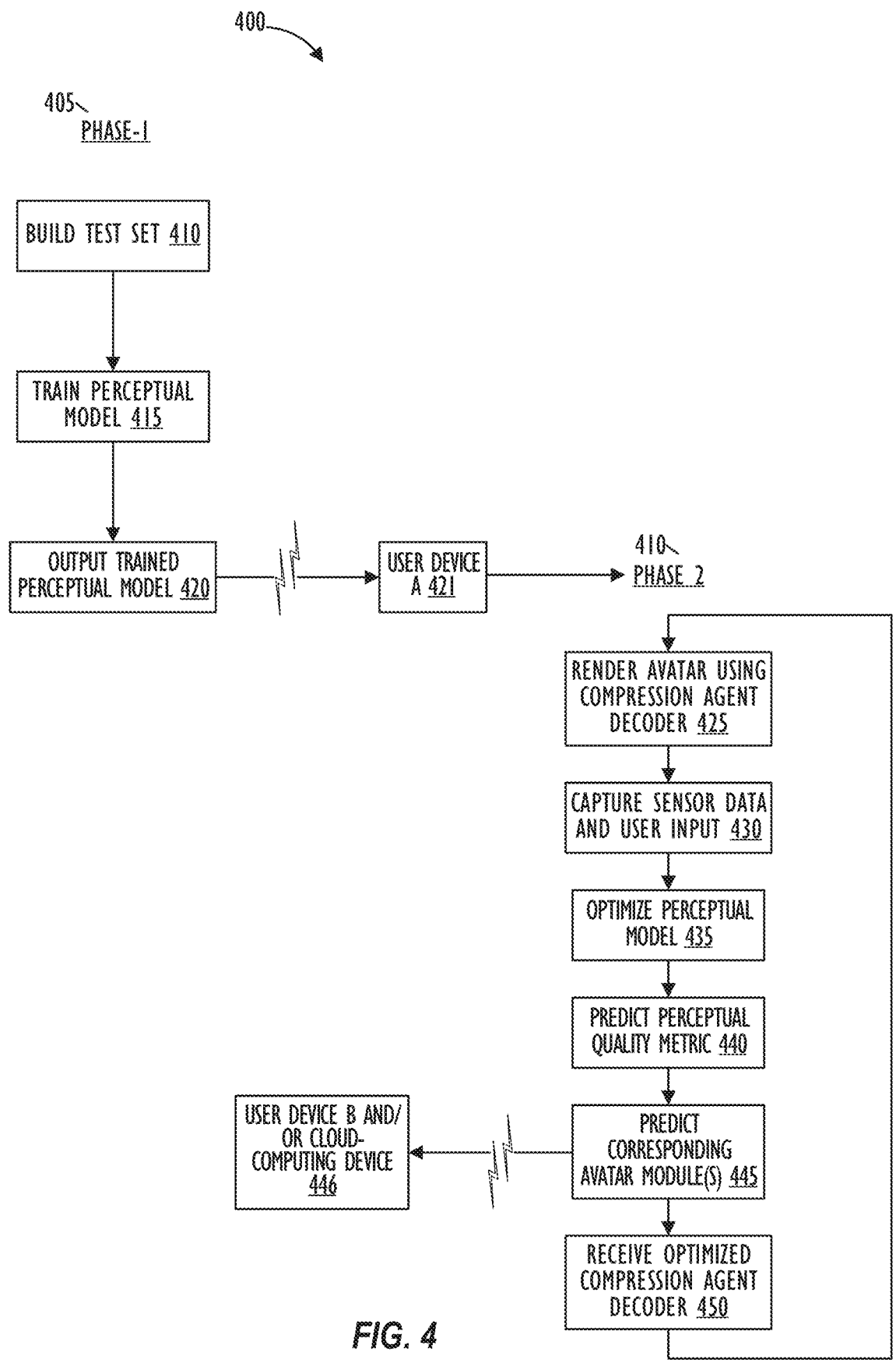
FIG. 4 shows, in flowchart form, a perceptual model generation and optimization operation in accordance with one or more embodiments.

FIG. 4 shows, in flowchart form, perceptual model generation and optimization operation 400 in accordance with one or more embodiments. As shown in FIG. 4, operation 400 may include two phases. Phase-1 405 may be an offline or a priori stage of building, testing, and training a perceptual model in a lab setting and outputting the trained perceptual model for installation on and use by various electronic devices. Phase-2 410 may involve utilizing the trained perceptual model on an electronic device to predict the perceptual quality metric value indicating a user's level of perceptual or cognitive comfort (e.g., uncanniness) with a rendered avatar model in continuous time. Phase-2 410 may also include optimizing the perceptual model based on individualized perceptual (and cognitive) measures and direct-report ground truth perceptual data associated with the specific user of the electronic device.

More specifically, phase-1 405 begins at block 410 with building a test set of labeled perceptual, physiological, and direct-report data of a population of users that represents the ground truth for building the perceptual model. For example, while each user of the population of users is experiencing avatar conversations with different avatar models, sensor data from one or more sensors associated with the user may be measured in an offline setting (e.g., in a lab). Further, the user may directly input (e.g., by moving a slider bar back and forth between a minimum and a maximum value) as ground truth perceptual data corresponding to the experienced avatar data, the user's level of perceptual and cognitive comfort (e.g., uncanniness) when experiencing the avatar conversation. This ground truth perceptual data may be captured from a plurality of users of the population experiencing a plurality of renderings based on different avatar models. For example, the avatar stimulus (and thus the rendered avatar) may be varied deliberately over the course of the experience to systematically explore the effect of different rendering perturbations on a perceptual experience of the user. The sensor data that may be measured from each user during the ongoing avatar experience may include: eye tracking data, pupillometry data, functional near-infrared spectroscopy (fNIRS) data, electroencephalography (EEG) data, galvanic skin response data, audio data (e.g., sound/speech of user), heart rate data, image data (e.g., face, head, body movement of user), facial expression data, thermal imaging data, gaze data, longitudinal information, head/body movement data, geolocation data, timestamp data, and the like. Based on the measured sensor data, corresponding labeled ground truth perceptual data directly input by the user (e.g., using a slider bar on a touch screen interface), and corresponding avatar data (e.g., what was actually rendered on the screen), correlations, markers or patterns in the measured sensor data can be identified, and the identified data along with corresponding ground truth data and avatar data may be used to create and train one or more perceptual models (block 415) using various machine learning techniques (e.g., supervised machine learning) to predict a perceptual quality metric value(s) (e.g., predicted level of uncanniness) for given input sensor data and given input avatar data.

For example, neurophysiological correlates like pupillometry data, gaze data, fNIRS data, EEG data, and the like may be used for detecting differential activation of IT cortex, Broca's area, and the like. As another example, behavioral correlates like gaze data, head/body movement data, facial expression data, and the like may be used to quantify any deviation from 'natural/normal' behavior during an avatar conversation. Some exemplary deviations that may be quantified as perceptual distance measures may include whether (and to what degree) the user's gaze in the physical environment follows movement of the mouth, eyes, and the like of the rendered avatar in the CGR environment in spatially and temporally consistent manner; whether (and to what degree) user's head nods and head orienting responses in physical environment are timed to event-related movements and utterances of talker (i.e., rendered avatar model) in CGR environment; whether (and to what degree) facial expressions/emotions of user in physical environment are behaviorally relevant and coordinated with expressions of talker (i.e., rendered avatar model) in CGR environment; and whether (and to what degree) physiological signals from the user in the physical environment covary with the cadence and time-varying content of the conversation in CGR environment. The perceptual distance measures may then be used along with corresponding labeled ground truth data to build and train machine learning models that may then be able to predict a perceptual quality value(s) corresponding to a rendered avatar model "on-the-fly", based on measured sensor data and the avatar data.

In addition, a deviation from a 'comfortable' avatar (measured as a perceptual distance measure or perceptual quality metric value or avatar realism quality) might also be viewed as a correlate of surprise, specifically, the difference between a user's prior expectations about the shape/location/dynamics of the rendered avatar and the actually observed avatar. In this setting, the parts of the avatar in CGR environment that look unnatural to users in the physical environment, such as the lip movements, general face dynamics or eye movements, would create a surprise signal that could be measured using physiological and/or neural measurements (e.g., in the auditory domain this would be referred to as mismatch negativity). This physiological surprise signal combined with the gaze location (and labeled ground truth) could be fused using machine learning algorithms to better understand which part (e.g., module) of the rendered avatar model has the unexpected/unnatural features. This technique may allow the perceptual model trained at block 415 to predict the perceptual quality metric value on a module-by-module basis, for each of a plurality of modules (e.g., eyes, nose, mouth, face, hands, legs, and the like) of the rendered avatar model. Once trained, the perceptual model may be output to user device 421 for installation and use.

As shown in FIG. 4, phase-2 410 of perceptual model generation and optimization operation 400 begins with rendering of an avatar model on a receiver device (e.g., user device 421) in electronic communication with another device for avatar-based conversation. As explained previously, the avatar model may be rendered based on avatar stimulus data of a live, real-time user whose image (e.g., facial expression data) and audio data is being captured and whose corresponding generated avatar model is being animated based on the image/audio data. Alternately, the avatar model may be rendered based on a synthetic avatar of an AI system that is being animated based on some stimulus (e.g., a human interacting with the synthetic avatar, the synthetic avatar receiving some information, and the like).

As also explained in connection with FIG. 3, the avatar model may be rendered on user device 421 upon receiving avatar data that is represented in a compressed latent space. For example, user device 421 may already have an instance of compression agent decoder 350 installed thereon. Once the user device 421 receives the avatar data, compression agent decoder 350 installed on user device 421 may reconstruct the full avatar model based on the received compressed latent space variables, thereby achieving significant reduction in communication bandwidth required for avatar-based communication. While the received latent space data is being rendered in continuous time using pre-existing compression agent decoder 350 on user device 421, one or more sensors associated with electronic user device 421 may capture various types of sensor data. The type of sensor data that may be captured "on-the-fly" while the user is experiencing the rendered avatar model on user device 421 may be similar to sensor data captured while training perceptual model at block 415. For example, the sensor data may include eye tracking data, pupillometry data, fNIRS data, EEG data, galvanic skin response data, audio data, heart rate data, image data, facial expression data, thermal imaging data, gaze data, longitudinal information, head/body movement data, geolocation data, timestamp data, direct-report data, and the like. The sensor data may be captured based on one or more sensors provided on the user device, or sensors (e.g., wearable technology sensors) that are communicatively coupled to the user device.

In training the perceptual model at block 415, correlations, markers, or patterns may also be identified between different types of sensor data so that correlations between certain types of (lab-based) sensor data (e.g., neurophysiological data like fNIRS data, EEG data, galvanic skin response data and the like) that may not be capturable "on-the-fly" on a portable electronic device (e.g., user device 421) or a wearable technology device in the "wild", and certain other types of (portable) sensor data (e.g., pupillometry data, gaze pattern data, head/face movement data, audio data, image data, and the like) that can be captured on the portable electronic device while the device is being used, may be determined. The perceptual model may thus be trained to identify certain predetermined patterns in "portable-friendly" sensor data as indicative of corresponding patterns in the "lab-based" sensor data, and output predictions (e.g., perceptual quality metric value for each of one or more modules of a rendered avatar model) based on the indication.

The data captured at block 430 may also include direct-report data from the user (e.g., input using a slider bar by the user experiencing the avatar) about the user's perceptual or cognitive comfort level. When such data is available, the data may supersede (or inform) the prediction output by the perceptual model. Further, the user input data may be used at block 435 to optimize (e.g., change, update, adjust and the like) the perceptual model to make future predictions output by the model more accurate based on the "ground truth" perceptual data input by the user at block 430 as direct-report data. By incorporating user input data in this manner, predictions of the perceptual quality metric values can be customized to an individual level, thereby allowing for avatar model optimization based on subjective perceptual or cognitive comfort levels while using objective sensor data. In another embodiment, the perceptual model trained at block 415 may be retrained or updated based on the user input "ground truth" data at block 430.

Training of the perceptual model at block 415 and/or optimization of the perceptual model at block 435 may be performed for a predetermined application or mode of use of the avatar model. For example, in case the application is reproducing photorealistic avatar models of specific users (e.g., for video communication) while using compression agents to reduce communication bandwidth, the perceptual model may be trained/optimized to predict whether (or to what degree) the avatar model is uncanny or canny (e.g., photorealistic or human-like). As another example, if the application is to create a fantasy "cartoon" character using visual effects, the perceptual model may be trained/optimized to predict the appealability of the rendered (cartoon) avatar model to an audience. Other applications may include training/optimizing a teacher avatar model for more effective instruction and information delivery, or applications of other synthetic avatar models.

Returning to FIG. 4, based on the captured data at block 430 and the optimized perceptual model at block 435, the perceptual model on the receiving device (e.g., user device 421) may output the predicted perceptual quality metric (e.g., value indicating a degree of uncanniness of the rendered avatar model, value indicating a degree of appealability of a rendered cartoon avatar model, and the like) (block 440), and predicted module (e.g., eyes, lips, nose, and the like of the rendered avatar model) of the avatar model the predicted perceptual quality metric value corresponds to (block 445). The predicted values may be transmitted (at 447) via a communication network (e.g., networks 103 or 104 in FIG. 1) to user device B and/or cloud-computing device 446, whereby the predicted values may be used to update or optimize the corresponding instance of (or the generic) compression agent (e.g., change any of the attributes specified in FIG. 2B) whose decoder was used to reconstruct the avatar model on user device A 421. Cloud-computing device 446 may be the similar to computing device 105 and provide similar features. At block 450, user device A 421 may receive updated compression agent decoder that has been optimized based on the prediction perceptual data transmitted at 447. User device A 421 may thereafter use the updated compression agent decoder when (re-) rendering the corresponding avatar model, thereby improving the perceptual or cognitive experience of the user of user device A 421, based on predicted/ground-truth perceptual data. Additional details on "closing-the-loop" on avatar model optimization by taking into consideration, individualized or subjective perceptual/cognitive comfort levels (e.g., avatar quality experience) of the user and optimizing the compression agent based thereon are provided in connection with the operation described in FIG. 5.

Figure 5:
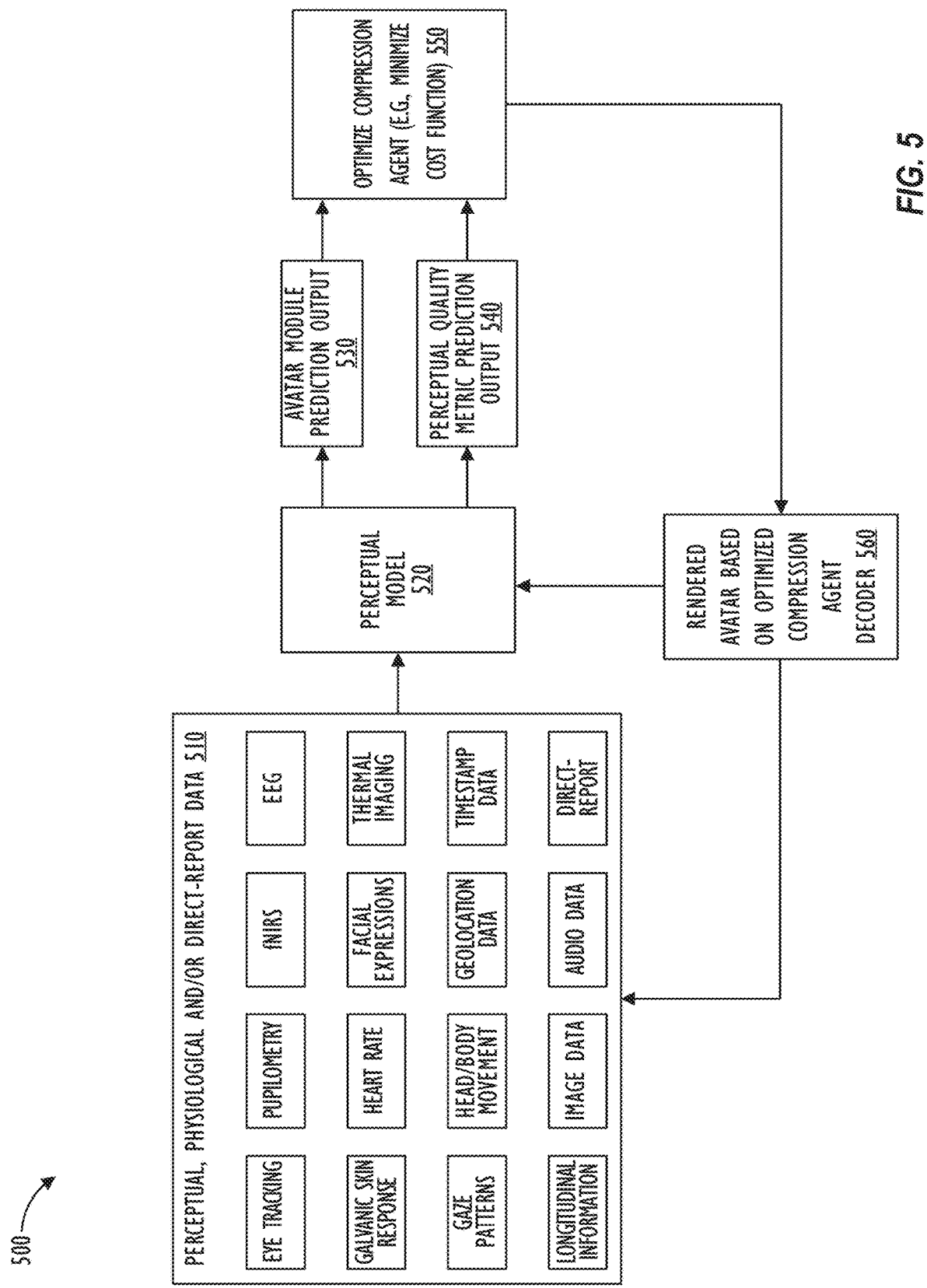
FIG. 5 shows a compression agent adjustment operation based on perceptual, physiological, and/or direct-report data in accordance with one or more embodiments.

FIG. 5 shows compression agent adjustment operation 500 based on perceptual, physiological, and/or direct-report data 510 in accordance with one or more embodiments. Each step of operation 500 can be performed by any of a cloud-computing device (e.g., computing device 105 in FIG. 1) and one or more mobile communication devices (e.g., device 108 in FIG. 1, devices 221 or 241 in FIG. 2A, or devices 421 or 446 in FIG. 4). As explained previously, perceptual, physiological, and/or direct-report data may be captured by one or more sensors associated with a device on which the avatar model is rendered. Perceptual, physiological, and/or direct-report data 510 detected by the one or more sensors may include eye tracking data (e.g., data indicating eye/pupil movement while user experiences the avatar rendering), pupillometry data (e.g., measurement data of pupil size and reactivity), fNIRS data (e.g., brain function neuroimaging data that measures brain activity through hemodynamic responses associated with neuron behavior, or correlation data indicating other sensor data that correlates with fNIRS data), and EEG data (e.g., electrophysiological monitoring data measuring electrical activity of the brain, or correlation data indicating other sensor data that correlates with fNIRS data). Perceptual, physiological, and/or direct-report data 510 may further include galvanic skin response data (e.g., measurement data of change in electrical resistance of skin caused by emotional stress, measurable with a sensitive galvanometer), heart rate data (e.g., heart beats per unit time), facial expression data (e.g., emotive state data like laughter, joy, amusement, satisfaction, revulsion, disgust, aversion, and the like), thermal imaging data, gaze pattern data (e.g., data of user indicating whether user looks more at the rendered avatar's eyes, more at the rendered avatar's mouth, and the like), head/body movement data (e.g., head-nods or other conversational cadence in a bi-directional conversation), geo-location data (e.g., GPS coordinates), timestamp data (e.g., date and time of sensor readout). Perceptual, physiological, and/or direct-report data 510 may further include longitudinal information (e.g., in a VR chat room setting, data indicating likelihood of the user going back and conversing again with the rendered avatar, in a videoconference setting with multiple rendered avatars, data indicating how long the user is looking at a particular rendered avatars and whether the user is avoiding looking at a particular rendered avatar), image data (e.g., image sensor data output at frame rate from an image sensor), audio data (e.g., audio data of the user recorded by a microphone), multimodal information (e.g., tone of voice, emotional information deciphered from audio data, specific keywords used, comfort level of viewer as deciphered from use of terminology, grammar, tone, timbre, sentence-length, verbosity, mirroring, and the like and the like) and direct-report data (e.g., manual input by the user on a touch screen using a slider bar indicating a value between min/max).

Figure 6:
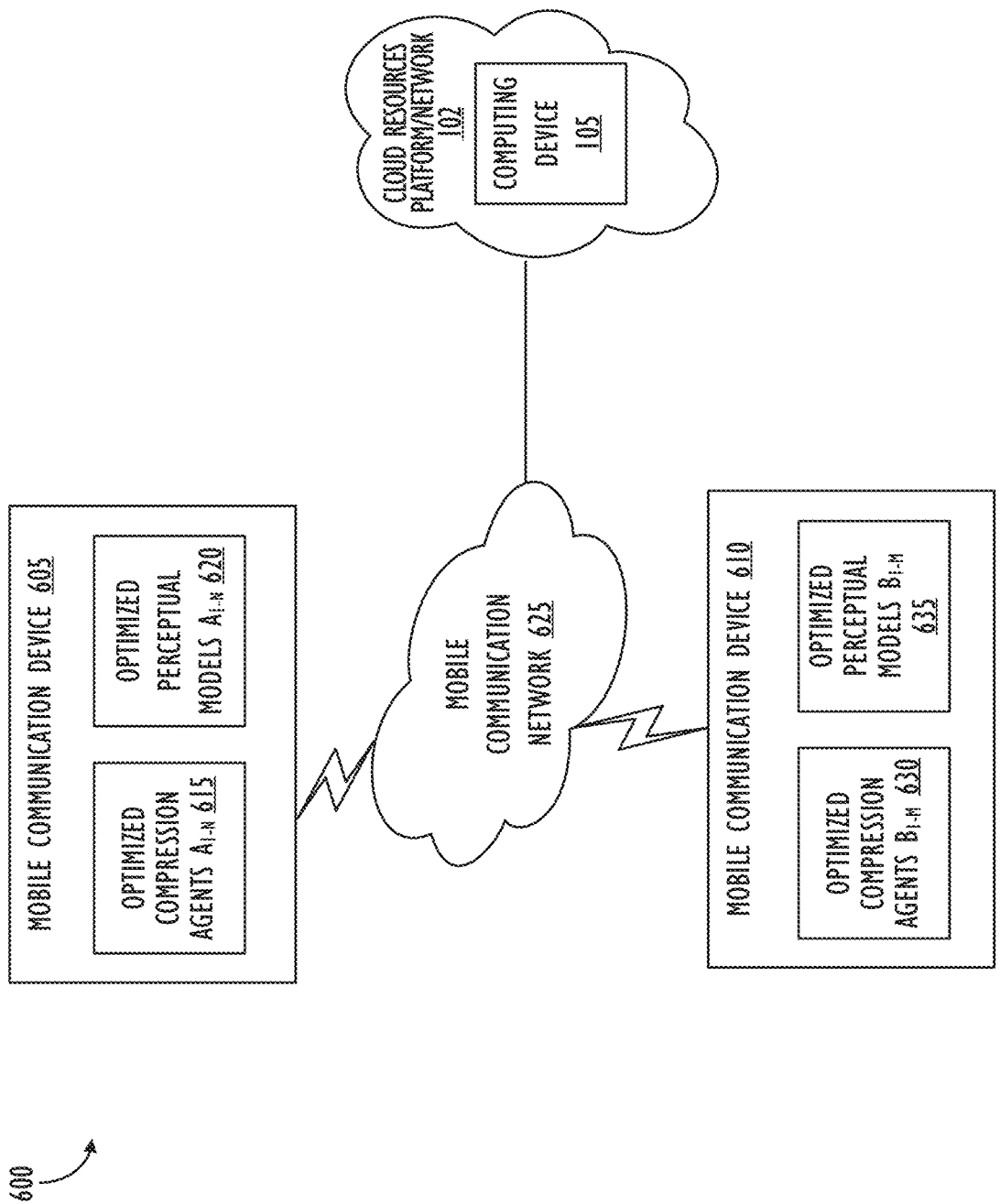
FIG. 6 shows an avatar rendering system customized for each user in accordance with one or more embodiments.

Perceptual model 520 may correspond to a trained perceptual model that is deployed for use and prediction on a user device (e.g., mobile computing devices 108, 605 or 610 in FIGS. 1 and 6, electronic device 221 or 241 in FIG. 2, user device 421 in FIG. 4, computing system 700 in FIG. 7) and that is optimized to predict perceptual quality metric values (perceptual quality metric prediction output 540) for one or more modules (avatar module prediction output 530) of avatar models based on input objective sensor data (e.g., input perceptual, physiological, and/or direct-report data 510) and subjective/individualized perceptual or cognitive comfort levels indicated by the user using direct-report input as "ground truth" perceptual data. In one embodiment, while a user of the user device is viewing the avatar rendering, the perceptual, physiological, and/or direct-report data 510 is generated by the one or more sensors in continuous time (e.g., at regular or irregular intervals). This data, along with the avatar data currently being rendered, may be input to perceptual model 520 to make a prediction regarding the user's subjective perceptual experience in the avatar conversation. As explained previously, the prediction can be more nuanced based on sensor data and adjustments made to perceptual model to detect the user's perceptual experience for each of different modules (e.g., eyes, mouth, and the like) or attributes (e.g., shown in FIG. 2B) of the rendered avatar.

Based on prediction data (530, 540) output from perceptual model 520, the compression agent used to generate the avatar model can be optimized to, e.g., reduce uncanniness of a particular module (e.g., eyes) of the avatar model or change a particular attribute (e.g., rendering quality, compression rate, bandwidth throttling, and the like). In an embodiment where the compression agent is an autoencoder, the optimization may involve, e.g., retraining an autoencoder corresponding to one or more of identity model, expression model, audio model, and the like, to minimize a corresponding perceptual cost function that is determined based on the output of the individualized/optimized perceptual model. Minimizing a cost function (to which the perceptual cost is augmented) when optimizing a compression agent implemented as an autoencoder in accordance with one or more embodiments is explained below in connection with Equation (2).

$$\operatorname*{argmin}_{W} \sum_{n} (y_n - h(x_n, W))^2 + \beta \sum_{i} w_i^2 + P \qquad \text{Equation (2)}$$

When $x_n$ represents an original representation (e.g., input identity model or avatar model) that is being compressed into latent space W, and $y_n$ represents an estimate of a reconstruction of $x_n$ from the compressed latent space W, the cost function can be represented using Equation (2). In Equation (2), $$\underset{W}{\operatorname{argmin}} \sum_n (y_n - h(x_n, W))^2$$

represents the reconstruction cost that is based on the difference between input $x_n$ and output $y_n$ (mean square reconstruction accuracy).

$$\beta \sum_i w_i^2$$

represents a regularization that that encourages weights to be small on average to reduce complexity.

Conventional autoencoders minimize the sum of reconstruction cost and regularization cost (loss function) through conventional techniques including credit assignment and backpropagation that results in some local minima of the particular cost function. However, this conventional loss function is purely geometric and does not take into account the perceptual experience of the user. In Equation (2), by adding the P term (that can hold a value between, e.g., 0-1 based on output of the perceptual model) to the cost function, the P term is flagged as an error or a larger cost function. The training operation of the autoencoder will then execute to find a set of weights (hidden layer node values and/or edge weights) that are ultimately the solution of the neural network that results is a lower overall cost.

Although the reconstruction accuracy (reconstruction cost) is a function of the weights, the P term is not a function of the weights. As a result, conventional techniques like credit assignment and backpropagation cannot be used to propagate the error back through the autoencoder to adjust the weights as a function of P. To perform error minimization in this case for the P term, local learning rules (e.g., random backpropagation, direct feedback alignment) may be employed. For example, when performing avatar optimization for specific modules, the local learning rules may add a perceptual mask to traditional techniques to influence weight learning procedures so that errors of a particular module (e.g., eyes) are minimized more than errors in other modules (e.g., mouth) by applying scaling numbers that are bigger for the module whose perceptual error is to be minimized more than that of other modules. Using the technique illustrated in connection with Equation (2), perceptual cost P derived from subjective and objective measures S (e.g., perceptual, physiological, and/or direct-report data 510; i.e., P=f(s)) may be used to complement conventional L1 or L2-error (e.g., least squares) based training of models.

Compression agent optimization at block 550 may be performed at any appropriate device level (e.g., cloud computer, sender device, receiver device, other device, and the like). Once the compression agent has been optimized, the portion of the compression agent that performs reconstruction of the compressed avatar model data based on the latent space data (e.g., decoder portion of autoencoder) may be used to render an avatar model on a user device (block 560). Sensor data from one or more sensors (e.g., perceptual, physiological, and/or direct-report data 510) may be again measured corresponding to the newly rendered avatar model at block 560 (e.g., re-rendered avatar model), and the viewer's perceptual or cognitive reaction to the avatar model.

The above described operation 500 may be performed iteratively (e.g., continuously, in real-time, "on-the-fly") during an ongoing avatar experience between two or more users, or between a user and a synthetic avatar. Compression agent optimization at 550 may be performed as frequently (or infrequently) based on system requirements, processing power availability, and other considerations that would be obvious to those skilled in the art. By utilizing the optimization procedures described herein, individualized perceptual measures derived from subjective and objective measures can be taken into consideration to optimize an avatar experience.

As a result, an avatar model of user A transmitted from user A's device to devices of users B and C for avatar-based electronic communication may be rendered differently on devices B and C based on corresponding perceptual data of users B and C. Further, the avatar model at user A's device may be encoded differently for transmission to B's device than to C's device, based on the received perceptual data from the respective device. For example, if user A is B's relative, even the slightest imperfections in rendering of A's avatar model on B's device may cause perceptual or cognitive discomfort to B. Perhaps audio data captured by B's device may indicate B's perceptual or cognitive discomfort. This data can be detected to predict a perceptual quality metric value indicating a high perceptual cost that needs to be minimized by training or optimizing the compression agent for A's avatar model as rendered to B. For example, A's device may cause A's avatar model (e.g., identity model) to be updated, or increase the latent space (to capture more data) to lower compression (thereby resulting in higher rendering quality).

On the other hand, C may be unrelated to A and may not notice slight imperfections in the rendering of A's avatar model on C's device. This may result in a lower perceptual cost prediction, thereby requiring lower amount of correction to the compression agent used for rendering A's avatar model on C's device. This example is illustrated figuratively in FIG. 6 of avatar rendering system 600 in which multiple different mobile communication devices (605, 610) have corresponding different individually optimized one or more compression agents (615, 630) and perceptual models (620, 635). Thus, the same avatar model may be steered in slightly different directions and displayed differently on devices 605 and 610, depending on what the corresponding device users prefer (individualized perceptual or cognitive comfort levels), what they are doing, what their situation is, what the corresponding device user is interested in seeing, and so on.

Figure 7:
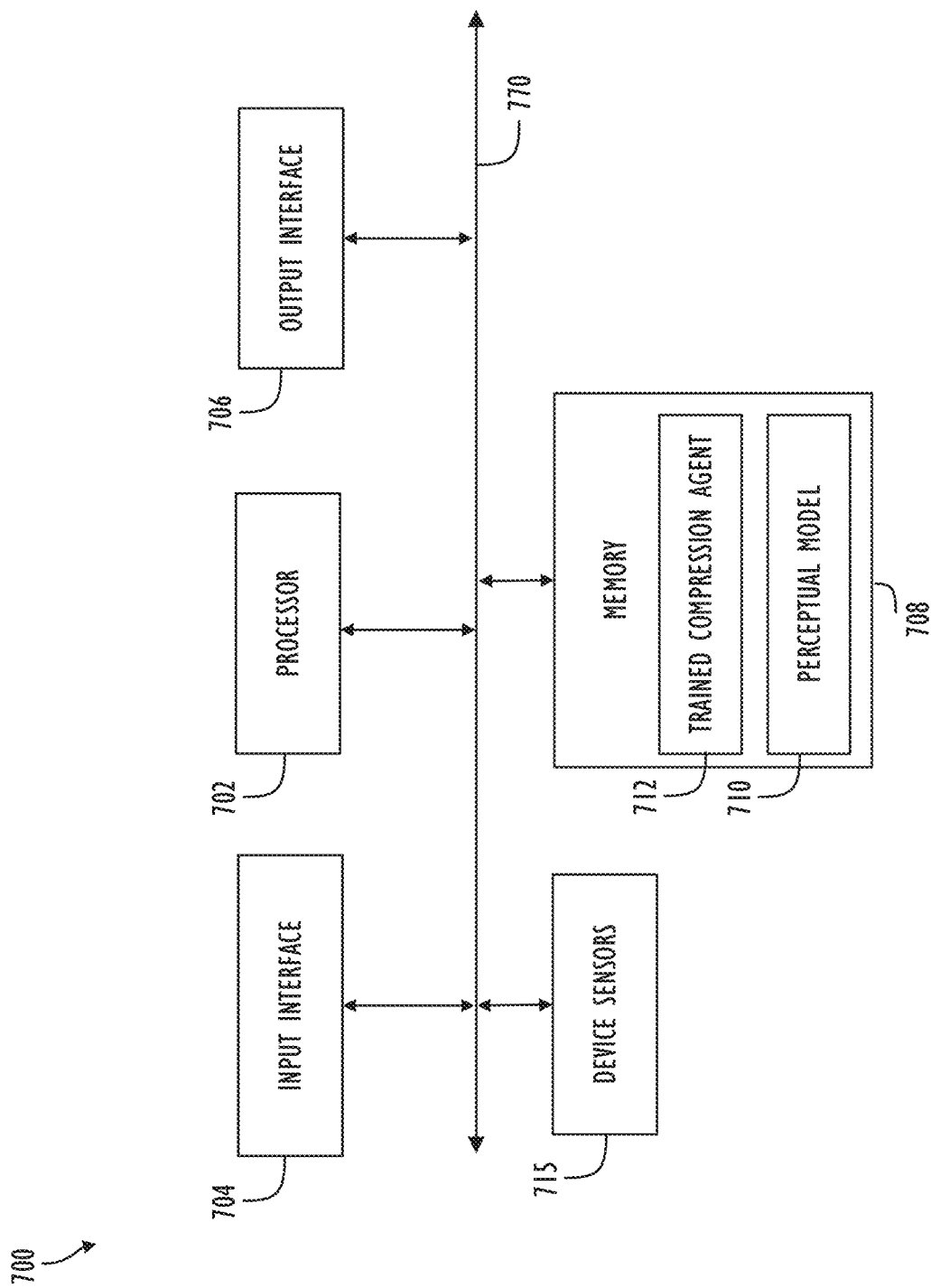
FIG. 7 shows an illustrative simplified block diagram of a computing system that includes a compression agent and a perceptual model in accordance with one or more embodiments.

FIG. 7 shows an illustrative simplified block diagram of a computing system 700 that includes trained compression agent 712 and perceptual model 710 in accordance with one or more embodiments. Computing system 700 may correspond to or may be part of a computer and/or any other computing device, such as a workstation, server, mainframe, super computer, and/or portable computing device. With reference to FIG. 1, computing system 700 may correspond to computing device 105 and/or mobile communication devices 108. The computing system 700 comprises a processor 702, which may be also be referenced as a central processor unit (CPU). The processor 702 may communicate (e.g., via a system bus 770) and/or provide instructions to other components within the computing system 700, such as the input interface 704, output interface 706, and/or memory 708. In one embodiment, processor 702 may comprise one or more multi-core processors and/or memory mediums (e.g., cache memory) that function as buffers and/or storage for data. Additionally, processor 702 may be part of one or more other processing components, such as application specific integrated circuits (ASICs), field-programmable gate arrays (FPGAs), and/or digital signal processors (DSPs). Although FIG. 7 illustrates that processor 702 may be a single processor, processor 702 is not so limited and instead may represent multiple processors. The processor 702 may be configured to implement any of the operations described herein, which operations 200-500 as described in FIGS. 2-5.

FIG. 7 illustrates that memory 708 may be operatively coupled to processor 702. Memory 708 may be a non-transitory medium configured to store various types of data. For example, memory 708 may include one or more memory devices that comprise secondary storage, read-only memory (ROM), and/or random-access memory (RAM). The secondary storage is typically comprised of one or more disk drives, optical drives, solid-state drives (SSDs), and/or tape drives and is used for non-volatile storage of data. In certain instances, the secondary storage may be used to store overflow data if the allocated RAM is not large enough to hold all working data. The secondary storage may also be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions.

As shown in FIG. 7, memory 708 may be used to house the instructions and models for carrying out various embodiments described herein. In an embodiment, the memory 708 may comprise perceptual model 710 and trained compression agent 712 that may be accessed and implemented by processor 702. Additionally, or alternatively, perceptual model 710 and trained compression agent 712 may be stored and accessed within memory embedded in processor 702 (e.g., cache memory).

In one embodiment, one or both of perceptual model 710 and trained compression agent 712 may be implemented using operations 200-500 as described in FIGS. 2-5. In one embodiment, memory 708 may interface with system bus 770 (e.g., a computer bus) to communicate and/or transmit information stored in memory 708 to processor 702 during execution of software programs, such as software applications that comprise program code, and/or computer executable process steps that incorporate functionality described herein.

Persons of ordinary skill in the art are aware that software programs may be developed, encoded, and compiled in a variety of computing languages for a variety of software platforms and/or operating systems and subsequently loaded and executed by processor 702. In one embodiment, the compiling process of the software program, may transform program code written in a programming language to another computer language such that the processor 702 is able to execute the programming code. For example, the compiling process of the software program may generate an executable program that provides encoded instructions (e.g., machine code instructions) for processor 702 to accomplish specific, non-generic, particular computing functions, such as predicting a perceptual quality metric value for each of one or more modules of a rendered avatar model.

After the compiling process, one or both of perceptual model 710 and trained compression agent 712 may be loaded as computer executable instructions or process steps to processor 702 from storage (e.g., memory 708, storage medium/media, removable media drive, and/or other storage device) and/or embedded within the processor 702. Processor 702 can execute the stored instructions or process steps to perform instructions or process steps (e.g., perceptual model 710 and trained compression agent 712) to transform computing system 700 into a non-generic, particular, specially programmed machine or apparatus. Stored data, e.g., data stored by a storage device, can be accessed by processor 702 during the execution of computer executable instructions or process steps to instruct one or more components within computing system 700.

Alternatively, rather than programming and/or loading executable instructions onto memory 708 and/or processor 702 to form a non-generic, particular machine or apparatus, persons of ordinary skill in the art are aware that stored instructions may be converted and implemented as hardware customized for a particular use. In one embodiment, implementing instructions, such as predicting perceptual quality metric for a module of an avatar model, by loading executable software into a computing device, can be converted to a hardware implementation by well-known design rules. For example, the compiling process of the software program, (e.g., perceptual model 710 and trained compression agent 712 may build a sequence of instruction bits that control and arrange a sequence of control gate-level components that write data onto buses, into latches and registers, across channels, memory, and/or other components of processor 702 and/or memory 708. The compiling of perceptual model 710 and trained compression agent 712 may produce gate-level components with fixed relationships designed to accomplish specific, non-generic, particular computing functions.

The decisions between implementing a concept in software versus hardware may depend on a number of design choices that include stability of the design and numbers of units to be produced and issues involved in translating from the software domain to the hardware domain. Often a design may be developed and tested in a software form and subsequently transformed, by well-known design rules, to an equivalent hardware implementation in an ASIC or other application specific hardware that hardwires the instructions or process steps of the software. In the same manner as a machine controlled by a new ASIC is a non-generic, particular, specially programmed machine or apparatus, likewise a computing device (e.g., a computer) that has been programmed and/or loaded with executable instructions or process steps (e.g., perceptual model 710 and trained compression agent 712) should be viewed as a non-generic, particular, specially programmed machine or apparatus.

FIG. 7 also illustrates that processor 702 may be operatively coupled to input interface 704 configured to receive input sensor data and/or direct-report data, and output interface 706 configured to output and/or display an avatar model and/or perceptual data. The input interface 704 may be configured to obtain input sensor data and/or direct-report data and/or other information via cables, connectors, wireless connections and/or other communication protocols. In one embodiment, the input interface 704 may be a network interface that comprises multiple ports configured to receive and/or transmit data via a network. In particular, the network interface may transmit the data via wired links, wireless link, and/or logical links. Other examples of input interface 704 may be universal serial bus (USB) interfaces, CD-ROMs, DVD-ROMs and/or connections to one or more sensors. Output interface 706 may include to one or more connections for a graphic display (e.g., monitors), a printing device that produces hard-copies of the generated results, and/or a plurality of ports that transmit data via cables, connectors, wireless connections, and/or other communication protocols.

FIG. 7 also illustrates that processor 702 may be operatively coupled to one or more device sensors 715 to generate the sensor data corresponding to a user of computing system 700 experiencing the avatar model. Device sensors 715 may include, but need not be limited to, an optical activity sensor, an optical sensor array, an accelerometer, a sound sensor, a barometric sensor, a proximity sensor, an ambient light sensor, a vibration sensor, a gyroscopic sensor, a compass, a barometer, a magnetometer, a thermistor sensor, an electrostatic sensor, a temperature sensor, a heat sensor, a thermometer, a light sensor, a differential light sensor, an opacity sensor, a scattering light sensor, a diffractional sensor, a refraction sensor, a reflection sensor, a polarization sensor, a phase sensor, a florescence sensor, a phosphorescence sensor, a pixel array, a micro pixel array, a rotation sensor, a velocity sensor, an inclinometer, a pyranometer, a momentum sensor, and heart rate sensor. Persons of ordinary skill in the art are aware that the computing system 700 may comprise other components well known in the art, such as other sensors, powers sources, and/or analog-to-digital converters, not explicitly shown in FIG. 7.

Reference in this disclosure to "one embodiment" or to "an embodiment" means that a particular feature, structure, or characteristic described in connection with the embodiment is included in at least one embodiment of the disclosure, and multiple references to "one embodiment" or "an embodiment" should not be understood as necessarily all referring to the same embodiment. The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

At least one embodiment is disclosed and variations, combinations, and/or modifications of the implementation(s) and/or features of the implementation(s) made by a person having ordinary skill in the art are within the scope of the disclosure. Alternative implementations that result from combining, integrating, and/or omitting features of the implementation(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). The use of the term "about" means+10% of the subsequent number, unless otherwise stated.

Many other implementations will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An avatar model rendering method, comprising:
   collecting sensor data of a first person at a first device viewing a rendered avatar corresponding to an avatar model of a second person different than the first person, wherein the second person is a user at a second device;
   determining a perceptual quality metric value corresponding to the rendered avatar based on the sensor data of the first person, wherein the perceptual quality metric value represents a quantified comfort level of the first person corresponding to the viewing of the rendered avatar of the second person based on the collected sensor data of the first person; and
   in accordance with a determination that the perceptual quality metric value satisfies a predetermined threshold:
   obtaining an adjusted avatar model, and
   re-rendering the rendered avatar for presentation at the first device based on the adjusted avatar model.

2. The avatar model rendering method according to claim 1, wherein the perceptual quality metric value at a predetermined point in time while the first person is viewing the rendered avatar represents a predicted level of uncanniness of the rendered avatar at a corresponding point in time.

3. The avatar model rendering method according to claim 2, wherein the rendered avatar is rendered using a compression agent, wherein the compression agent is implemented using an autoencoder, and wherein the perceptual quality metric value is determined as a perceptual cost that is augmented into an overall cost function of the autoencoder.

4. The avatar model rendering method according to claim 3, wherein re-rendering the rendered avatar comprises adjusting the compression agent, and wherein adjusting the compression agent comprises:
   causing the autoencoder to be retrained to minimize the overall cost function including the perceptual cost to obtain a retrained autoencoder; and
   obtaining a decoder portion of the retrained autoencoder.

5. The avatar model rendering method according to claim 4, wherein the perceptual quality metric value is determined intermittently or periodically while the first person is viewing the rendered avatar, and wherein the retraining of the autoencoder is performed intermittently or periodically during a batch process based on the intermittently or periodically determined perceptual quality metric values.

6. The avatar model rendering method according to claim 3, wherein re-rendering the rendered avatar comprises adjusting the compression agent, and wherein adjusting the compression agent comprises adjusting at least one of:
   a rendering quality or a resolution of the re-rendered avatar;
   a movement or motion during re-rendering of the rendered avatar; and
   audio data output in association with the re-rendered avatar.

7. The avatar model rendering method according to claim 1, wherein the sensor data is obtained from one or more sensors, wherein the sensor data indicates the first person's perceptual, physiological, or direct-report response to the avatar, and wherein the sensor data includes one or more of eye tracking data, pupillometry data, gaze pattern data, electroencephalography data, functional near-infrared spectroscopy data, image data, audio data, head/body movement data, facial expression data, heart rate data, thermal imaging data, galvanic skin response data, geo-location data, timestamp data, longitudinal information, and direct-report data.

8. The avatar model rendering method according to claim 1, wherein the rendered avatar is rendered based on at least one of image or audio data of a live user captured in real-time in a physical environment, and image or audio output data of an artificial intelligence system driving a synthetic fantasy avatar.

9. The avatar model rendering method according to claim 1, wherein a relationship between the sensor data and the perceptual quality metric value is determined based on a perceptual model configured to quantitatively characterize a relationship between avatar perceptual quality values and corresponding values of the sensor data.

10. An avatar model rendering system comprising:
a memory; and
one or more processors operatively coupled to the memory, wherein the memory comprises instructions that, when executed by the one or more processors, cause the one or more processors to:
collect sensor data of a first person viewing a rendered avatar at a first device corresponding to an avatar model of a second person different than the first person, wherein the second person is a user at a second device;
determine a perceptual quality metric value corresponding to the rendered avatar based on the sensor data of the first person, wherein the perceptual quality metric value represents a quantified comfort level of the first person corresponding to the viewing of the rendered avatar of the second person based on the collected sensor data of the first person; and
in accordance with a determination that the perceptual quality metric value satisfies a predetermined threshold:
obtain an adjusted avatar model, and
re-render the rendered avatar for presentation at the first device based on the adjusted avatar model.

11. The avatar model rendering system according to claim 10, wherein the perceptual quality metric value at a predetermined point in time while the first person is viewing the rendered avatar represents a predicted level of uncanniness of the rendered avatar at a corresponding point in time.

12. The avatar model rendering system according to claim 11, wherein the rendered avatar is rendered using a compression agent, wherein the compression agent is implemented using an autoencoder, and wherein the perceptual quality metric value is determined as a perceptual cost that is augmented into an overall cost function of the autoencoder.

13. The avatar model rendering system according to claim 12, wherein the instructions that, when executed by the one or more processors, cause the one or more processors to re-render the rendered avatar comprise instructions that, when executed by the one or more processors, cause the one or more processors to adjust the compression agent, and wherein the instructions that cause the one or more processors to adjust the compression agent comprise instructions that, when executed by the one or more processors, cause the one or more processors to:
cause the autoencoder to be retrained to minimize the overall cost function including the perceptual cost to obtain a retrained autoencoder; and
obtain a decoder portion of the retrained autoencoder.

14. The avatar model rendering system according to claim 13, wherein the perceptual quality metric value is determined intermittently or periodically while the first person is viewing the rendered avatar, and wherein the retraining of the autoencoder is performed intermittently or periodically during a batch process based on the intermittently or periodically determined perceptual quality metric values.

15. The avatar model rendering system according to claim 12, wherein the instructions that, when executed by the one or more processors, cause the one or more processors to re-render the rendered avatar comprise instructions that, when executed by the one or more processors, cause the one or more processors to adjust the compression agent, and wherein the instructions that cause the one or more processors to adjust the compression agent comprise instructions that, when executed by the one or more processors, cause the one or more processors to adjust at least one of:
a rendering quality or a resolution of the re-rendered avatar;
a movement or motion during re-rendering of the rendered avatar; and
audio data output in association with the re-rendered avatar.

16. The avatar model rendering system according to claim 10, wherein the sensor data is obtained from one or more sensors, wherein the sensor data indicates the first person's perceptual, physiological, or direct-report response to the avatar, and wherein the sensor data includes one or more of eye tracking data, pupillometry data, gaze pattern data, electroencephalography data, functional near-infrared spectroscopy data, image data, audio data, head/body movement data, facial expression data, heart rate data, thermal imaging data, galvanic skin response data, geo-location data, timestamp data, longitudinal information, and direct-report data.

17. The avatar model rendering system according to claim 10, wherein the rendered avatar is rendered based on at least one of image or audio data of a live user captured in real-time in a physical environment, and image or audio output data of an artificial intelligence model driving a synthetic fantasy avatar.

18. The avatar model rendering system according to claim 10, wherein a relationship between the sensor data and the perceptual quality metric value is determined based on a perceptual model configured to quantitatively characterize a relationship between avatar perceptual quality values and corresponding values of the sensor data.

19. A non-transitory program storage device, readable by one or more programmable control devices and comprising instructions stored thereon to cause the one or more programmable control devices to:
collect sensor data of a first person viewing a rendered avatar at a first device corresponding to an avatar model of a second person different than the first person, wherein the second person is a user at a second device;
determine a perceptual quality metric value corresponding to the rendered avatar based on the sensor data of the first person, wherein the perceptual quality metric value represents a quantified comfort level of the first person corresponding to the viewing of the rendered avatar of the second person based on the collected sensor data of the first person; and
in accordance with a determination that the perceptual quality metric value satisfies a predetermined threshold:
obtain an adjusted avatar model, and
re-render the rendered avatar for presentation at the first device based on the adjusted avatar model.

20. The non-transitory program storage device according to claim 19, wherein the perceptual quality metric value at a predetermined point in time while the first person is viewing the rendered avatar represents a predicted level of uncanniness of the rendered avatar at a corresponding point in time.

* * * * *